United States Patent [19]
Ueki

[11] Patent Number: 5,477,847
[45] Date of Patent: Dec. 26, 1995

[54] HEATING DEVICE

[75] Inventor: Akio Ueki, Osaka, Japan

[73] Assignee: Kiribai Chemical Co., Ltd., Osaka, Japan

[21] Appl. No.: 117,064

[22] PCT Filed: Dec. 21, 1993

[86] PCT No.: PCT/JP92/01678

§ 371 Date: Sep. 14, 1993

§ 102(e) Date: Sep. 14, 1993

[87] PCT Pub. No.: WO94/14363

PCT Pub. Date: Jul. 7, 1994

[51] Int. Cl.[6] .................................................. F24J 1/00
[52] U.S. Cl. .......................... 126/263.07; 126/263.01; 432/5; 432/6; 432/10; 432/31; 432/184; 432/194; 432/226
[58] Field of Search ..................... 432/226, 194, 432/184, 10, 6, 5, 31; 126/263 R, 263 DB

[56] References Cited

U.S. PATENT DOCUMENTS

| | | | |
|---|---|---|---|
| 3,512,516 | 6/1968 | Glass et al. | 126/263 DB |
| 4,265,216 | 5/1981 | Marshall et al. | 126/263 DB |

FOREIGN PATENT DOCUMENTS

| | | |
|---|---|---|
| 50-28506 | 9/1975 | Japan . |
| 57-69839 | of 1982 | Japan . |
| 59-51775 | 4/1984 | Japan . |
| 60-77880 | 5/1985 | Japan . |
| 60-134765 | 9/1985 | Japan . |
| 6-148272 | 10/1985 | Japan . |
| 61-66497 | 5/1986 | Japan . |

Primary Examiner—Henry A. Bennet
Assistant Examiner—Siddharth Ohri
Attorney, Agent, or Firm—Armstrong, Westerman, Hattori, McLeland and Naughton

[57] ABSTRACT

A heating device including a first exothermic member disposed below a subject to be heated for preventing heat radiation from the subject while heating the subject from below, a second exothermic member disposed above the subject for preventing heat radiation from the subject while heating the subject from above, and a base or sandwiching and supporting body for bearing the subject sandwiched between the first exothermic member and the second exothermic member while securing a space under the first exothermic member. The heating device is convenient to carry about and capable of easily heating a food or the like without rapidly generating a great amount of heat.

2 Claims, 7 Drawing Sheets

HEATING DEVICE

TECHNICAL FIELD

The present invention relates to a heating device. More specifically, it relates to a heating device which is convenient to carry about and capable of easily heating a cooked food in any place while never causing an accident, such as a burn, due to a high heat.

BACKGROUND ART

There has hitherto been known an exothermic body containing CaO as a main ingredient for heating a cooked food contained in a flat bag. This exothermic body utilizes heat generated by an exothermic reaction of CaO with water to heat the food.

However, the above-described exothermic body has entailed a danger of setting a flammable material on fire or burning a person due to damage of a recipient (enveloping body) containing the exothermic body because it rapidly generates a great amount of heat upon occurrence of the exothermic reaction.

For this reason, there has been earnestly desired a safe heat source free of such a disadvantage.

In view of the above-mentioned circumstance, it is an object of the present invention to provide a safe heat source which avoids rapid generation of a great amount of heat and is capable of easily heating a food or the like.

DISCLOSURE OF THE INVENTION

A heating device of the present invention is characterized by comprising:

(1) a first exothermic member disposed below a subject to be heated for preventing heat radiation from the subject while heating the subject from below, a second exothermic member disposed above the subject for preventing heat radiation from the subject while heating the subject from above, and a base for bearing the subject sandwiched between the first exothermic member and the second exothermic member while securing a space under the first exothermic member, whereby the subject is heated on both sides thereof; or (2) a first exothermic member abutting one side of a subject to be heated for preventing heat radiation from the subject while heating the subject laterally, a second exothermic member abutting the other side of the subject for preventing heat radiation from the subject while heating the subject laterally, and a sandwiching and supporting body for accommodating the subject sandwiched between the first exothermic member and the second exothermic member, whereby the subject is heated on both sides thereof.

BEST MODE FOR CARRYING OUT THE INVENTION

Hereinafter, a heating device of the present invention will be explained with reference to the attached drawings.

Figure 1:
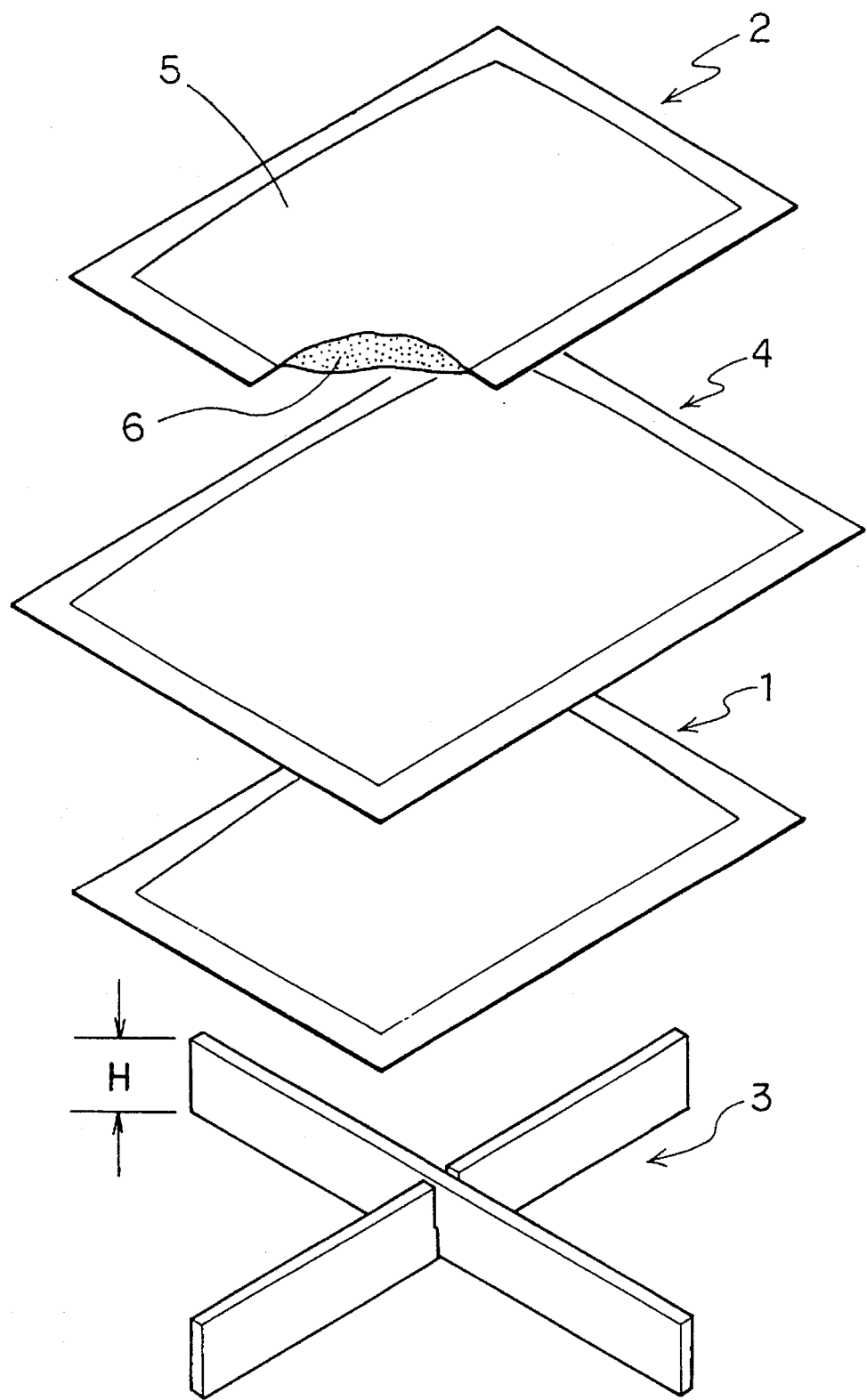
FIG. 1 is an explanatory view showing an embodiment of a heating device according to the present invention.

In FIG. 1, numeral 1 denotes a first exothermic member, which is disposed below a subject 4 to be heated wherein a cooked food is contained in a flat bag, and plays a role of preventing heat radiation from the subject 4 while heating the subject 4 from below. Numeral 2 denotes a second exothermic member, which is disposed above the subject 4 and plays, like the first exothermic member 1, a role of preventing heat radiation from the subject 4 while heating the subject 4 from above.

Both of the first exothermic member 1 and second exothermic member 2 are of a structure wherein a heat-generating agent 6, which would be oxidized to generate heat in the presence of air, is enclosed in a flat bag 5. The flat bag 5 has an air-permeable surface in at least a portion thereof. That is, one side of the flat bag 5 can be formed of an air-permeable surface while the other side thereof can be formed of an air-impermeable surface. Alternatively, both sides thereof can be formed of an air-permeable surface. Further, a portion of one side thereof can be formed of an air-permeable surface while the other portion thereof can be formed of an air-impermeable surface.

There is no particular limitation in the air-permeability of the flat bag 5. A permeable pore can be of any size so long as it will not allow the content in the flat bag 5 to fall out of it, for example, about 0.5 mm or less. In addition, the amount of permeable air is in the range of 5–100 cc/cm$^2$.s in terms of a value determined by Frazil method, preferably in the range of about 30 to 70 cc/cm$^2$.s.

Though materials for the flat bag 5 are not particularly limited, it is preferable to use such materials that are napless, soft, strong, and stable in quality and have applicability for heat sealing. Examples of such materials usable therefor include a plastic-like or rubber-like flexible thermoplastic sheet or film comprising polyurethane, polypropylene or polyethylene, or modifications thereof; and a single or complex layer of non-woven fabric, polyvinyl chloride, polyester or polystyrene. As a method for controlling air-permeability of an air-permeable surface of the flat bag 5, there can be mentioned a method wherein appropriate heat welding treatment is applied to a sheet or film on which minute continuous pores are formed. Concretely speaking, the air-permeability can be controlled by, for example uniformly dispersing or entirely applying heat welding agent which is heated appropriately on a sheet or film having uniform continuous pores of 1 to 50 μm in diameter.

The air-permeability can also be controlled by laminating a resin film formed with minute air-permeable pores on a non woven fabric.

Though the size of the flat bag 5 is not particularly limited in the present invention, flat bags of a size from 4×6 cm to 15×20 cm can usually be employed.

As the heat-generating agent 6 enclosed in the flat bag 5, there can be employed compositions comprising metal powder (preferably treated with sulfur or a sulfur-containing compound) such as of iron, activated carbon, water, a water-holding material (wood flour, vermiculite, diatomaceous earth, pearlite, silica gel, alumina, water-absorptive and the like), sodium chloride, and the like. These compositions are not limitative. As the activated carbon, preferable is that having an iodine adsorption of 800 to 1200 mg/g.

The first exothermic member 1 and the second exothermic member 2 can be separated as shown in FIG. 1, or joined with each other to form a unitary structure, which is folded at about the mid-point thereof to sandwich the subject 4.

Figure 5A:
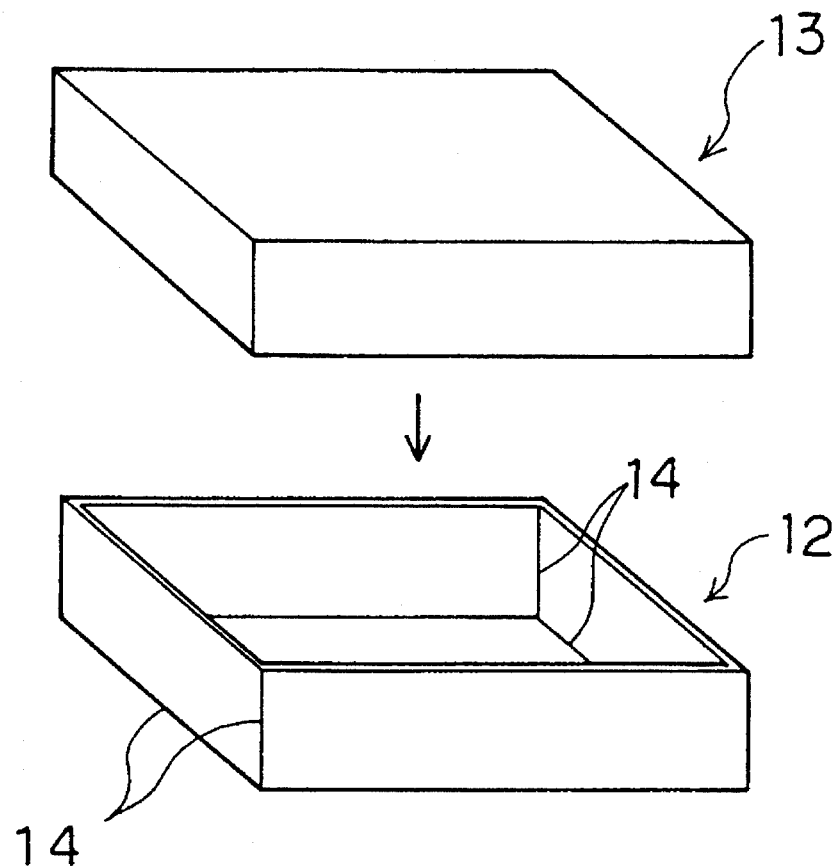
FIGS. 5(a) and 5(b) are is an explanatory view showing a further alternative example of a base for which a packaging box for an exothermic member is utilized.
Figure 5B:
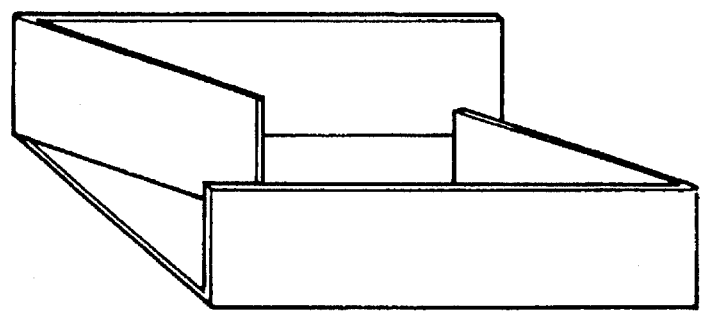
Figure 6A:
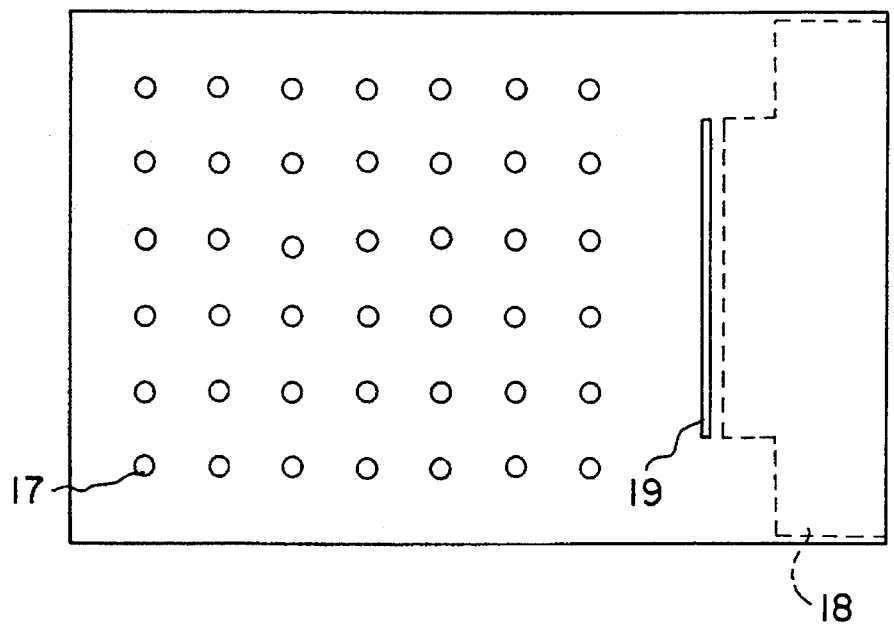
FIGS. 6(a) and 6(b) are is an explanatory view showing an yet further example of a base for which a packaging box for an exothermic member is utilized.
Figure 6B:
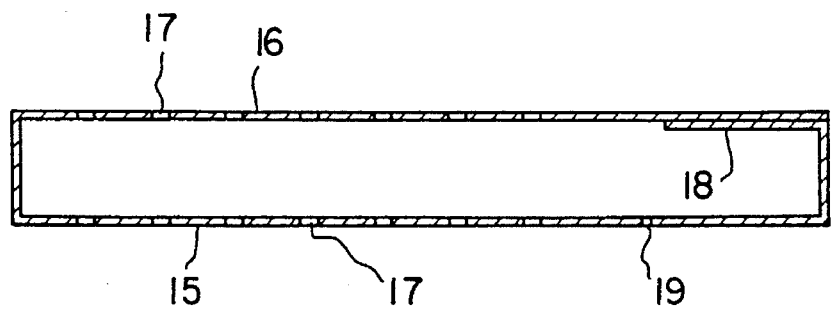
Figure 6C:
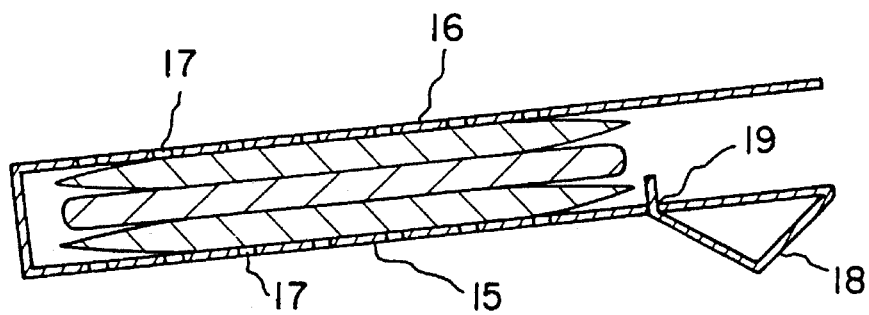

Numeral 3 denotes a base for bearing the subject 4 sandwiched between the first exothermic member 1 and second exothermic member 2. This base 3 can be made of synthetic resin, cardboard or metal material, such as tinplate. The shape of the base 3 is not particularly limited in the present invention. The base 3 can be of any shape, for example, cross-shaped (refer to FIG. 1), parallel cross-shaped (refer to FIG. 2) or triangular-shaped (FIG. 3) so long as it is shaped to secure a space below the first exothermic member 1 for maintaining a good exothermic reaction from the exothermic member. Alternatively, a box packaging the exothermic member can be used as the base by previously forming a cut, dotted line, or the like, to the box and assembling it into a base when to be used. FIGS. 4 to 6 illustrate specific examples of such a case. In the example shown in FIG. 4(*a*), an inner box 10 is previously provided with a fold 11, and then bent inwardly at the fold 11 to form the base (refer to FIG. 4(*b*)). In the example shown in FIG. 5(*a*), an inner box 12 of a packaging box comprising the inner box 12 and a cover 13 is previously provided with a dotted line 14, and then partially cut along the dotted line 14, followed by inwardly folding two opposite sides of the inner box 12 to form the base (refer to FIG. 5(*b*)). Further, in the example shown in FIG. 6(*a*), a box is provided with a plurality of vent perforations 17 on the front side 15 and back side 16 thereof, and then a tongue piece 18 of the box is folded back and inserted into a slit 19 formed in the back side 16 to form the base (refer to FIG. 6(*c*)). In this case too, a space is secured below the first exothermic member through the vent perforations 17.

Figure 2:
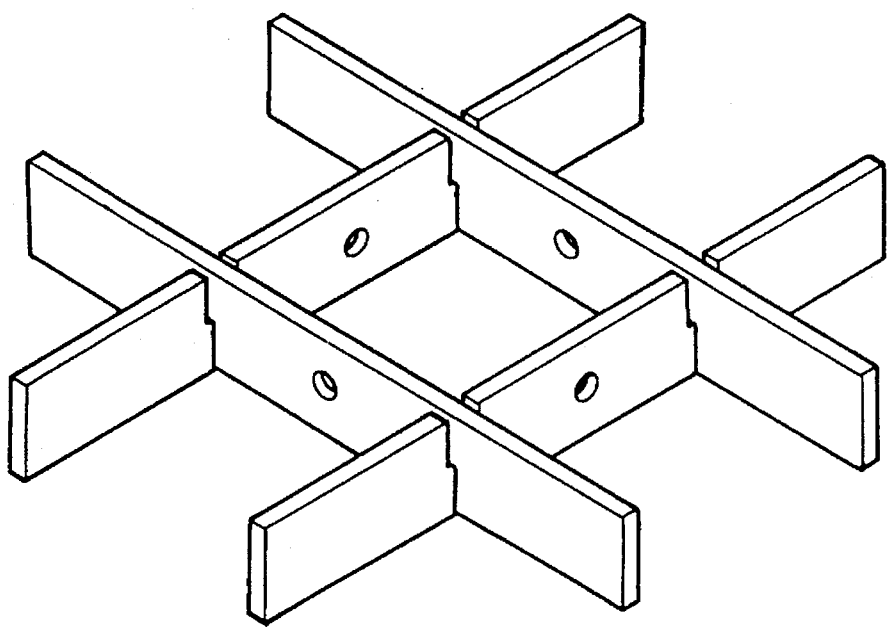
FIG. 2 is an explanatory view showing another example of a base used in a heating device according to the present invention.
Figure 3:
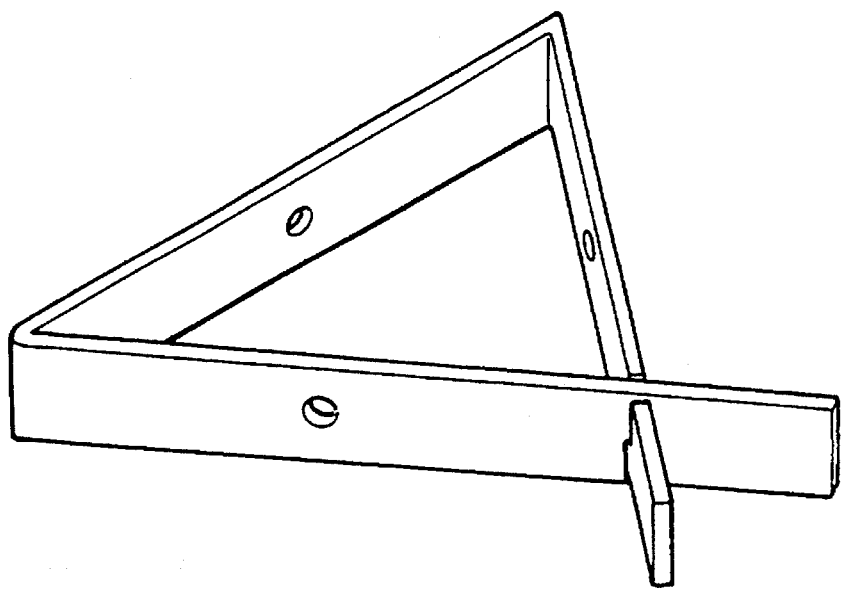
FIG. 3 is an explanatory view showing yet another example of a base used in a heating device according to the present invention.
Figure 4A:
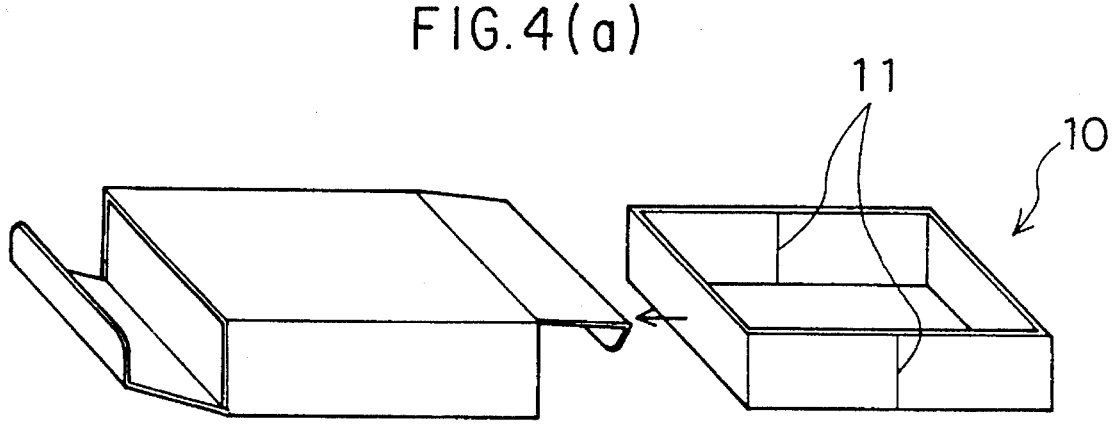
FIGS. 4(a) and 4(b) are is an explanatory view showing an alternative example of a base for which a packaging box for an exothermic member is utilized.
Figure 4B:
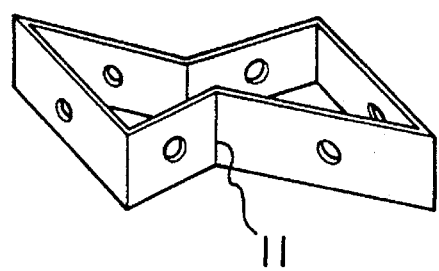

It should be noted that the bases shown in FIGS. 2 to 4 might be formed with appropriate vent perforations. Although the height H of the base 3 (refer to FIG. 1) is not particularly limited, the aim of the height H is usually about 5 to 20 mm.

Figure 7:
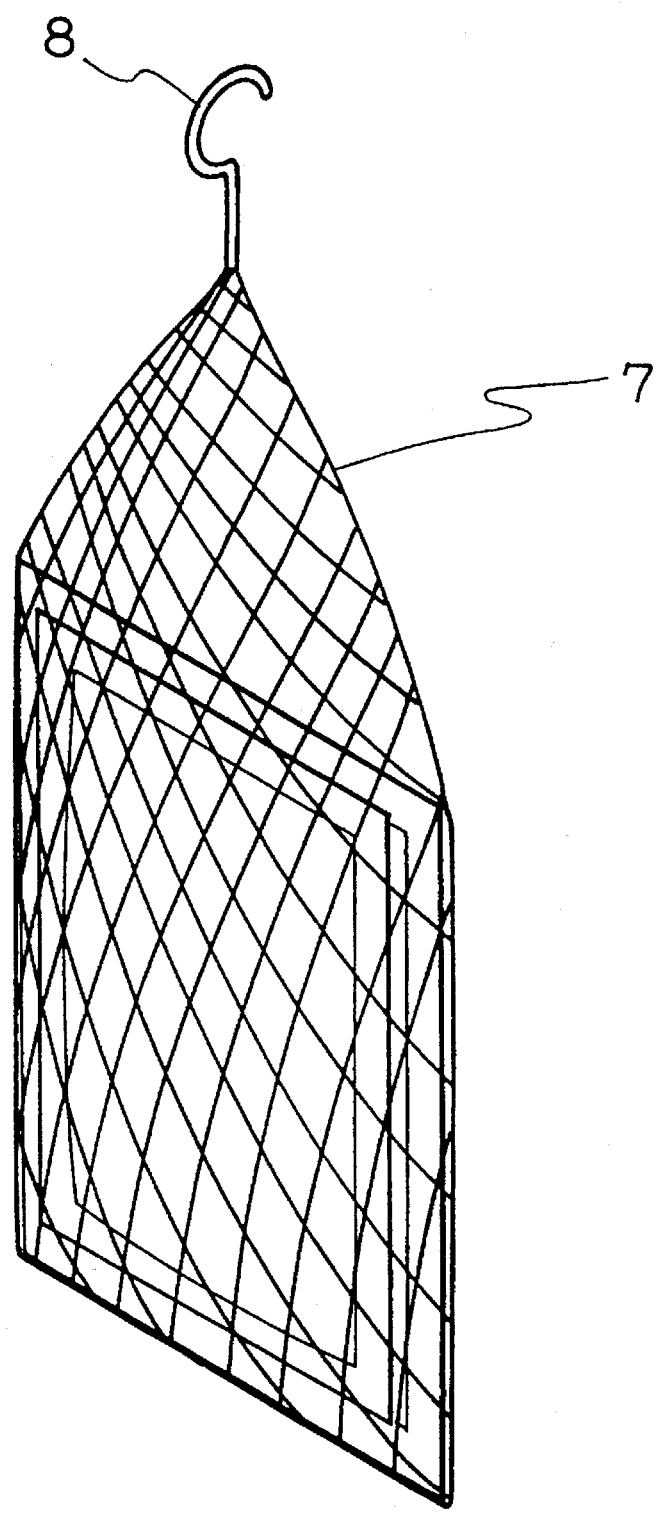
FIG. 7 is an explanatory view showing another embodiment of a heating device according to the present invention.

FIG. 7 illustrates another embodiment of the heating device according to the present invention. The arrangement of this embodiment is such that a subject 4 to be heated, which is sandwiched on both sides thereof between a first exothermic member 1 and a second exothermic member 2, is accommodated in a network bag 7 as a supporting body enabling the sandwiching of the subject between the first and second exothermic members. A hanger 8 is attached to one end of the network bag 7 and, hence, allows the subject 4 to be hung on a hook (not shown), or the like, which is provided on a ceiling.

As the network bag 7 there can be employed one made of synthetic resin, fiber, rubber or the like. A mesh of the net can be appropriately selected so long as the network bag can accommodate the subject 4, or the like, without letting it fall.

It is worth noting that the subject 4 accommodated in the network bag 7, or the like, can be placed on the base 3 in the above-mentioned embodiment and heated.

Figure 8:
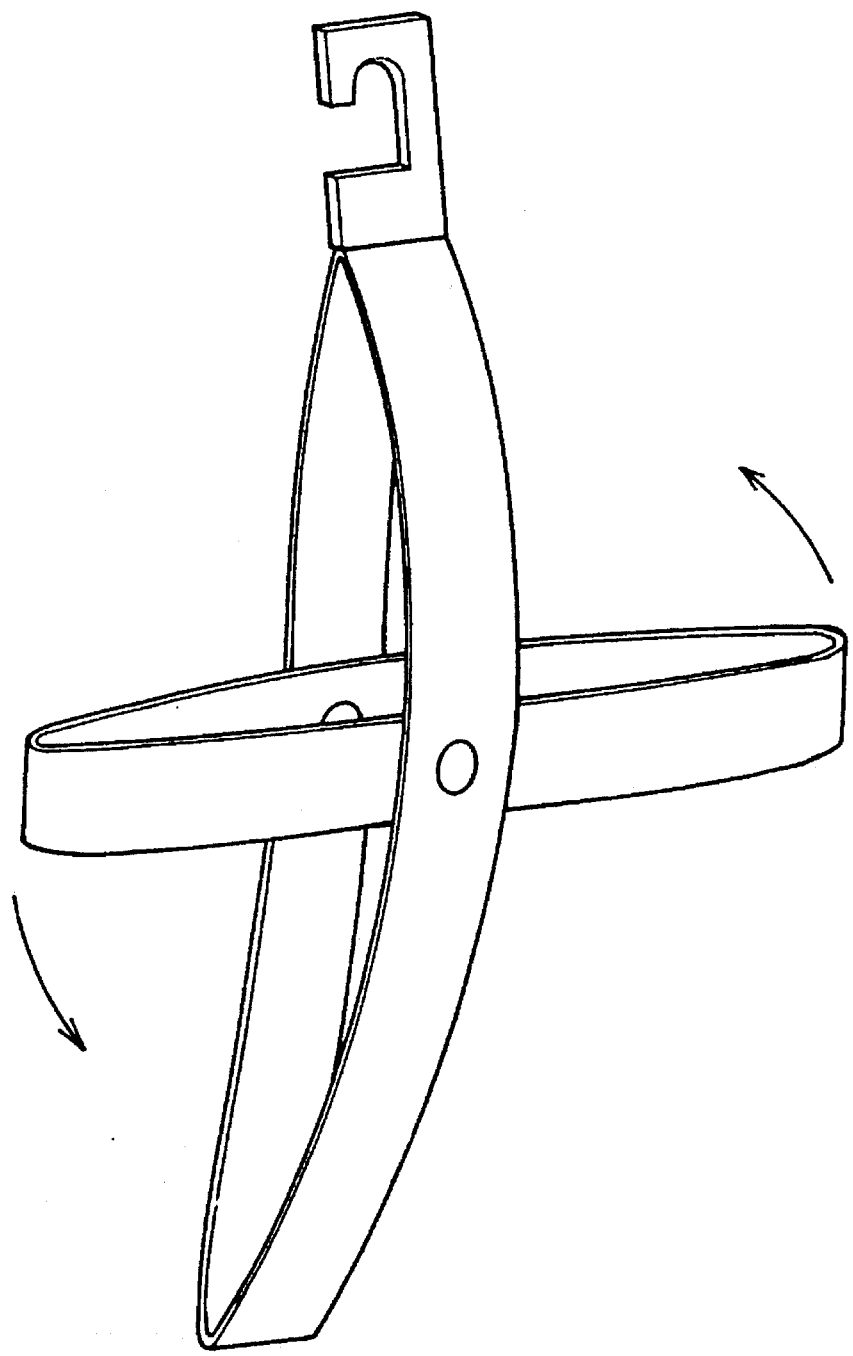
FIG. 8 is an explanatory view showing another example of a sandwiching and supporting body used in the present invention.

In addition, although the network bag is used as the sandwiching and supporting body in the embodiment shown in FIG. 7, it is possible to use therefor a paper band (refer to FIG. 8), string or the like.

As has been described, the heating device of the present invention will not rapidly generate a great amount of heat because it uses iron powder and activated carbon as main ingredients without using CaO, which has conventionally been used. For this reason it can safely be used without danger of setting a flammable material on fire or burning a person.

In addition, since a subject to be heated is sandwiched on both sides thereof between exothermic members, it can be quickly heated to a high temperature with less heat radiation therefrom. Further, the device can easily be carried to anywhere and heated in any place.

INDUSTRIAL APPLICABILITY

The heating device of the present invention can easily heat a food or the like without rapid generation of a great amount of heat and is, hence, useful as a heating device to be carried about.

I claim:

1. A heating device comprising:

a first exothermic member disposed below a subject to be heated for preventing heat radiation from the subject while heating the subject from below, a second exothermic member disposed above the subject for preventing heat radiation from the subject while heating the subject from above, said first and second exothermic members being each defined by a container enclosing an air-oxidizable, heat-generating agent, said container being formed at least in part by an air permeable material and a base for bearing the subject to be heated sandwiched between the first exothermic member and the second exothermic member and being operative for securing a space under the first exothermic member.

2. A heating device comprising:

a first exothermic member abutting one side of a subject to be heated for preventing head radiation from the subject while heating the subject laterally, a second exothermic member abutting the other side of the subject for preventing heat radiation from the subject while heating the subject laterally, said first and second exothermic members being each defined by a container enclosing an air-oxidizable, heat-generating agent, said container being formed at least in part by an air permeable material, and a sandwiching and supporting body for accommodating the subject sandwiched between the first exothermic member and the second exothermic member.

\* \* \* \* \*